(12) United States Patent
Voigt et al.

(10) Patent No.: US 6,484,978 B2
(45) Date of Patent: Nov. 26, 2002

(54) CARDAN SUPPORT

(76) Inventors: Che Ram Souza Voigt, 505 Divisadero St., #B2, San Francisco, CA (US) 94117; Allan Alfred Voigt, 400 Breezewood Dr., Geyserville, CA (US) 95441; John Michael Speicher, 133 Rossi, Geyserville, CA (US) 95441

( * ) Notice: Subject to any disclaimer, the term of this patent is extended or adjusted under 35 U.S.C. 154(b) by 38 days.

(21) Appl. No.: 09/837,248

(22) Filed: Apr. 18, 2001

(65) Prior Publication Data

US 2002/0050180 A1 May 2, 2002

Related U.S. Application Data

(60) Provisional application No. 60/198,521, filed on Apr. 19, 2000.

(51) Int. Cl.$^7$ .............................................. F16M 11/14
(52) U.S. Cl. .................................................. 248/182.1
(58) Field of Search .............................. 414/590, 138.2, 414/138.3; 248/182.1, 179, 694, 181.1, 278.1, 183.4, 183.3, 178.1

(56) References Cited

U.S. PATENT DOCUMENTS

| | | | |
|---|---|---|---|
| 4,063,462 A | * 12/1977 | Himmler | 73/483 |
| 4,242,917 A | * 1/1981 | Bennett et al. | 74/5 F |
| 4,276,122 A | * 6/1981 | Snyder | 126/577 |
| 5,119,305 A | * 6/1992 | Ferro | 244/161 |
| 5,212,480 A | * 5/1993 | Ferro | 33/330 |
| 5,368,271 A | * 11/1994 | Kiunke et al. | 248/179.1 |
| 5,897,223 A | * 4/1999 | Tritchew et al. | 348/144 |
| 6,110,337 A | * 8/2000 | Sullivan et al. | 204/298.03 |

* cited by examiner

Primary Examiner—Korie Chan
(74) Attorney, Agent, or Firm—Risto A. Rinne, Jr.

(57) ABSTRACT

An apparatus for the support of a cardan shaft within a gimbal ball includes a pair of cardan support cranes that are adapted to pivot around an inner elevation axis in the ball and which each support one of a pair of vibration isolators. Each end of the cardan shaft is supported by one of the vibration isolators. An outer elevation drive motor is attached to the ball and drives against a bevel section of a combination bevel sector and spur gear that is attached to an outer support structure, that supports the ball. The motor drives the ball in elevation relative to the outer support structure. This causes the ball to rotate relative to the bevel sector and spur gear. A spur gear portion or the bevel sector and spur gear drives an idler gear which drives, in turn, a spur gear section of the cardan support crane, the cardan support crane having a true one to one gear ratio with respect to the spur gear portion of the bevel sector and spur gear thereby maintaining normal alignment of the cardan support crane with respect to the cardan shaft. A mirror image supports the opposite side of the cardan shaft. A second motor can be used or omitted on the opposite side. An alternative placement for a modified spring in the cardan shaft is also disclosed.

13 Claims, 8 Drawing Sheets

CARDAN SUPPORT

BENEFIT OF PRIORITY

This utility patent application claims the priority of "Provisional Application" No. 60/198,521 filed on Apr. 19th, 2000, entitled "Modular Gimbal" by applicants John M. Speicher, Allan A. Voigt, and Che R. S. Voigt.

RELATED APPLICATION

This application is related to another utility patent application by the same applicants, being filed concurrently, entitled "Offset Cardan Gimbal".

BACKGROUND OF THE INVENTION

1. Field of the Invention

The present invention, in general relates to gimbals and, more particularly, to gimbals that have a cardan assembly that is used to support and to move sensors and instrumentation about a plurality of axes.

Gimbals are commonly used to hold sensors stable when mounted on a moving vehicle, be it a land based vehicle, a sea (i.e., a water based) vehicle such as a boat or ship, or an air based vehicle such as an airplane or a helicopter.

The ability to hold a sensor stable while the vehicle moves is useful for a great variety of purposes. These purposes include obtaining information useful for navigation. Another purpose relates in general to an ability to align and then to hold the sensors where desired. Whatever information is being provided by the sensors is more reliable if the sensors themselves are held steady.

In general, gimbals have a plurality of outer axes and a plurality of inner axes. Course adjustments are commonly accomplished by movements made along the outer axes. Finer adjustments are commonly made with the inner axes.

There are a number of discreet functions a gimbal must achieve. It must both properly orient, maintain position, and support the size and weight of the sensors. This can vary from application to application.

The sensors are placed inside of a gimbal ball along with numerous other component parts that are used to orient the gimbal ball as required.

Another problem with prior art designs is supporting the weight of the sensors, also referred to as a "payload". It is desirable to increase the effective payload of a gimbal and to better support the weight of the payload.

Gimbals include a cardan assembly that is disposed within a ball. The cardan assembly supports the weight of the payload that is carried by the gimbal as well as allowing small angular rotation in the positioning of the payload within the ball.

These changes in position are accomplished by rotating the payload (within the gimbal ball) about three axes (typical), namely elevation, roll, and azimuth. Courser adjustments are accomplished by moving the gimbal ball itself typically in two axes, elevation and azimuth.

The cardan assembly includes a cardan shaft that traverses the inside diameter of the ball. The center of the cardan shaft is used to define an internal elevation axis.

The cardan assembly must support the weight of the payload as it moves. The cardan shaft is typically supported by vibration isolators that are disposed on both ends thereof. There is a desire that the vibration isolators be as soft as possible, to better dampen the payload from vehicle fluctuations. However, a very soft isolator is subject to compression from the loading (i.e., the weight) of the payload, as well as from the magnitude of changes in loading that occur as the gimbal translates in elevation.

Therefore, a way to effectively offset the weight of the payload is desirable.

Past attempts have relied upon a spring mounted to the outer axis structure to supply a counter force upon the cardan assembly. However, these outer axis springs cause the outer axis structure to be large. This leaves less room for the gimbal ball. The space within the gimbal ball is valuable and is preferably used to optimally contain the sensors.

Furthermore, as a result of additional improvements made to gimbals by the instant applicants (see "Related Applications") a gimbal may now utilize an offset type of a cardan having an offset between the inner elevation axis and the outer elevation axis. The offset cardan may experience an even greater range of physical movement within the gimbal ball than do prior art designs. Accordingly, the use of spring mounted to the outer axis with an offset type of a cardan becomes increasingly impractical to utilize because a spring that must function over an even greater range of travel becomes even larger, further reducing ball volume.

Accordingly, the present disclosure relies upon an offset cardan type of a gimbal to maximally show the benefits of the instant invention. Of course, these improvements apply to and can be used with other types of gimbals (i.e., with or without an offset cardan) as well.

An offset type of a cardan assembly (with respect to the elevation axis) also allows for a physically larger payload to be carried for any given gimbal ball diameter. This potentially increases the loading upon the cardan assembly and therefore, further increases the need to provide effective support for the cardan and its payload.

It is important to understand that the internal axes provide finer corrections than do the external axes and accordingly, a smaller range of motion is therefore acceptable for movement of the payload within the gimbal ball. Larger corrections are made by moving the entire gimbal ball relative to the vehicle upon which the gimbal itself is mounted.

Ideally, for any given size of a gimbal as large and as heavy a payload as can be had is preferred as is providing the optimum support for the cardan in all of the positions that it can possibly acquire (i.e., be moved to).

It is also important to note that the cardan assembly may be used to support multiple types of sensors simultaneously. For example, a zoom television camera can be used for general spotting purposes and to locate an object of interest as well as for general pointing (i.e., aiming) of the gimbal. Upon locating the object of interest, a larger focal length camera can be used to more carefully study it. Accordingly, both types of cameras can be simultaneously mounted as part of the overall payload that is supported by the cardan assembly.

The payload may also be active instead of passive. A passive payload merely observes the object of interest whereas an active payload is adapted to affect it. The payload may be used to support an active component that can, for example, illuminate the object. For example, a gimbal can contain a source of illumination, such as a spotlight or a laser, and be mounted on, for example, a helicopter. Accordingly, as the helicopter hovers and fluctuates in its position relative to the object, the gimbal can be used to compensate for any movement by the helicopter in order to hold the source of illumination constantly upon the object.

If the source of illumination is a spotlight, then a larger and heavier payload capacity allows for a larger and brighter spotlight to be used. The same benefits apply if any other type of an active (or passive) payload is utilized.

Another problem is that when larger changes occur in elevation, these changes are made about an external or outer elevation axis. It is difficult to keep the direction of support provided to a cardan shaft normal with respect to a deck of an air vehicle to which the gimbal is attached. It is the deck of the air vehicle that is the important plane of reference, but local apparent gravity is generally perpendicular to the deck of the vehicle as is known to those possessing ordinary skill in the design of gimbals.

Furthermore, for any given weight of a payload it is desirable that the vibration isolators be as soft as is possible. A very soft vibration isolator provides optimum isolation of the payload.

Accordingly, there exists today a need for a cardan support that affords relief regarding any of the aforementioned prior art limitations.

Clearly, such an apparatus would be useful and desirable.

2. Description of Prior Art

Gimbals are, in general, known. While the structural arrangements of the known types of devices, at first appearance, may have similarities with the present invention, they differ in material respects. These differences, which will be described in more detail hereinafter, are essential for the effective use of the invention and which admit of the advantages that are not available with the prior devices.

OBJECTS AND SUMMARY OF THE INVENTION

It is an object of the present invention to provide a cardan support that provides a gimbal having an improved ability to maintain (i.e., hold) sensors in proper alignment with their intended object of interest.

Still yet another object of the invention is to provide a cardan support that provides a gimbal having a greater payload capacity.

It is a first continuing object of the present invention to provide a cardan support that includes a gimbal that has an offset between the outer elevation axis and the inner elevation axis that is useful in increasing payload weight It is a second continuing object of the present invention to provide a cardan support that includes a gimbal that has an offset between the outer elevation axis and the inner elevation axis that is useful in increasing payload volume.

It is a third continuing object of the present invention to provide a cardan support that is adapted for use with either passive or active types of payloads.

It is a fourth continuing object of the present invention to provide a cardan support that more effectively supports the weight of a payload.

It is a fifth continuing object of the present invention to provide a cardan support that is adapted to support the weight of a payload by supplying a counter force that is normal to the deck of the vehicle to which the gimbal is attached.

It is a sixth continuing object of the present invention to provide a cardan support that is adapted to support the weight of a payload by supplying a counter force that is normal to the deck of the vehicle to which the gimbal is attached while the gimbal ball moves about an outer elevation axis.

It is a seventh continuing object of the present invention to provide a cardan support that allows for the use of softer vibration isolators.

It is an eighth continuing object of the present invention to provide a cardan support that provides support to offset the local gravitational load of the sensors.

It is a ninth continuing object of the present invention to provide a cardan support that provides a method to maintain support for the gravitational load of the sensors in a normal attitude regardless of the orientation of the gimbal including that of the vehicle upon which it is mounted.

It is a tenth continuing object of the present invention to provide a cardan support that includes passive vibration isolators.

It is an eleventh continuing object of the present invention to provide a cardan support that improves the performance of a passive vibration isolator.

It is a twelfth continuing object of the present invention to provide a cardan support that includes a passive vibration isolator that supports the static weight of a payload.

It is a thirteenth continuing object of the present invention to provide a cardan support that includes mounting a vibration isolator on a rotational bearing so that an isolator assembly is adapted to rotate.

It is a fourteenth continuing object of the present invention to provide a cardan support that includes a support spring.

It is a fifteenth continuing object of the present invention to provide a cardan support that includes a cardan crane support.

It is a sixteenth continuing object of the present invention to provide a cardan support that allows selection for component parts thereof from the group of constant force springs, torsionally sprung spools, dual material rubber isolators, and non-symmetrical shapes to optimally support the weight of the payload.

It is a seventeenth continuing object of the present invention to provide a cardan support that uses an active system to support and to align a counter balancing force with respect to a payload.

It is a eighteenth continuing object of the present invention to provide a cardan support that uses a passive system to support and align a counter balancing force with respect to a payload that includes either a gear, cam, or belt drive to control the orientation of the counter balancing force.

Briefly, A cardan support structure for a gimbal that is constructed in accordance with the principles of the present invention has a cardan assembly that is used to support and move a payload. The cardan assembly includes a cardan shaft that extends across the inside of a gimbal ball, the center of which defines an inner elevation axis. The cardan assembly includes an inner azimuth axis, and an inner roll axis, about which the payload is adapted to rotate. Disposed on each end of the cardan shaft is a cardan support crane. A cardan support spring is connected at one end to each of the cardan support cranes and to each end of the cardan shaft at a remaining end. Each cardan support crane is driven by movement of the ball relative to an outer elevation axis. On one side of the cardan, an outer elevation drive motor moves the ball relative to an outer axis structure (i.e., a yoke) which in turn moves the cardan support crane on that side. Movement of the ball similarly moves the cardan support crane on the opposite side so that each of the cardan support cranes is held normal with respect to a deck of a vehicle upon which the gimbal is mounted. An alternative placement for the spring in the cardan shaft is disclosed.

DETAILED DESCRIPTION OF THE INVENTION

Figure 1:
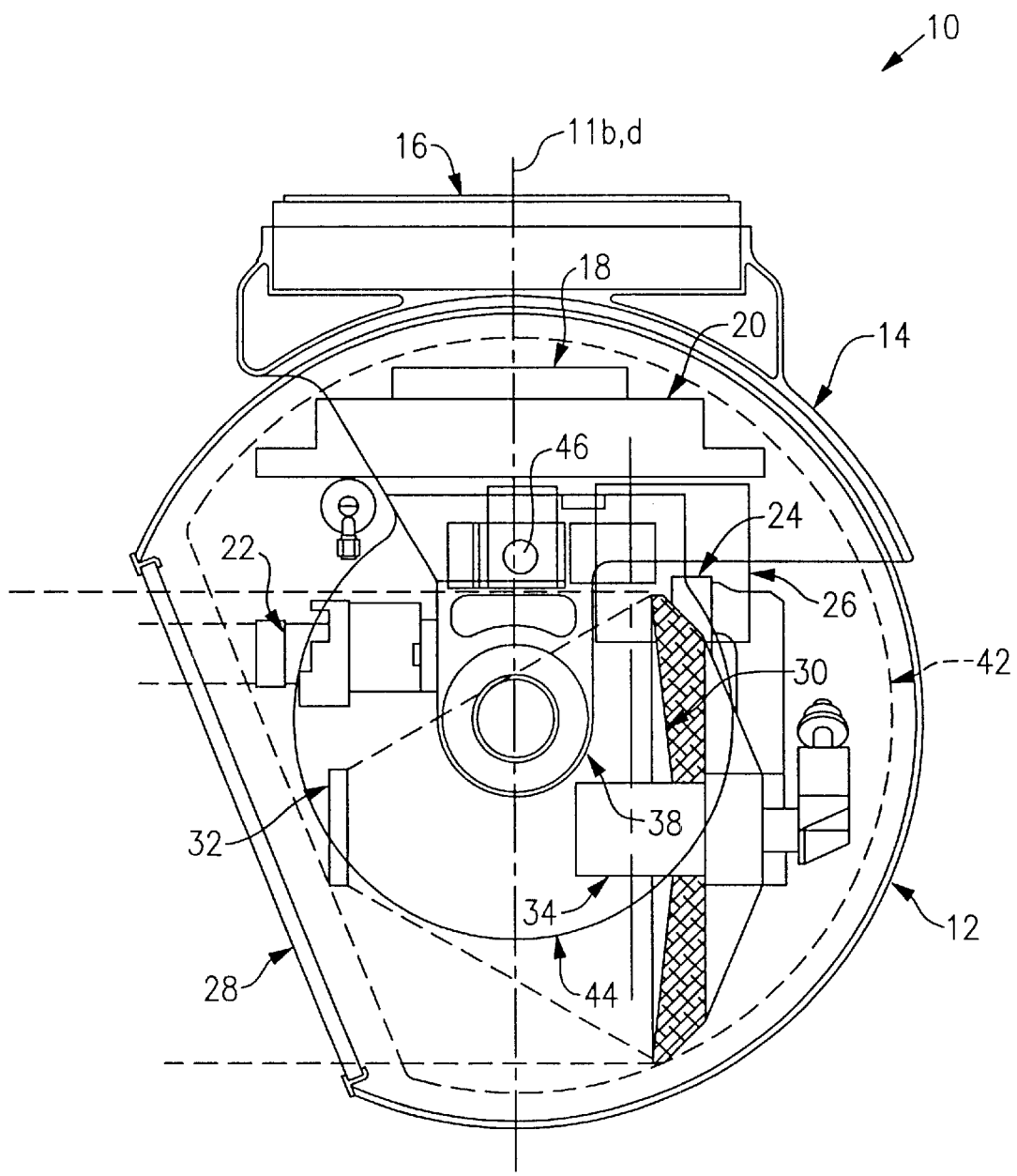
FIG. 1 is cross-sectional side view of an offset cardan type of gimbal adapted for use with the instant invention.

Referring on occasion to all of the FIGURE drawings and in particular now to FIG. 1 is shown an offset cardan gimbal, identified in general by the reference numeral 10. The instant invention, as shown, is adapted for use with the offset cardan gimbal 10. As this is a new type of a gimbal, a description of the offset cardan gimbal 10 is initially provided for clarity. The detailed description of the cardan support begins with FIG. 3 and will easier to understand after the functioning of the gimbal 10 is known.

The gimbal 10 is a five-axis type of a gimbal, although the improvements, as described, apply to any type of a gimbal having any number of axes of movement. The gimbal 10 includes two external axes, an external or an outer elevation axis 11a and an external or an outer azimuth axis 11b, such as are well known to those possessing ordinary skill in the art. It similarly includes an internal or an inner elevation axis 11c, and an internal or an inner azimuth axis 11d, and an internal or an inner roll axis 11e.

Changes about these axes that are made by the gimbal 10 compensate for movement by the vehicle (not shown) to which the gimbal 10 is mounted. The gimbal 10 is typically attached to a vehicle of some type including, for example, any land, sea, or air type of a vehicle.

The gimbal 10 maintains alignment of a sensor (or sensors) that it carries with an object of interest while the vehicle moves. This is accomplished by proportionately controlling the various axes so as to move the sensors in response to detected movement that is experienced by the vehicle.

Normally, courser adjustments in elevation and azimuth are accomplished by the outer elevation axis 11a and by the outer azimuth axis 11b. Finer adjustments in elevation and azimuth are accomplished by the inner elevation axis 11c and the inner azimuth axis 11d. Changes in roll are accomplished by the inner roll axis 11e.

Motors receive control signals in response to changes that occur along these axes of movement. For example, one or a plurality of gyroscopes may be used to detect such motion. Output from the gyroscope(s) can be processed (by a computer or other circuitry) which can then be used to immediately supply appropriate feedback to the various motors that control position along these axes, thereby compensating for movement and keeping the sensors that are supported by the gimbal 10 aligned with whatever object it is observing. This is described in greater detail hereinafter.

The gimbal 10 may be of any desired size. It includes a gimbal ball 12. The ball 12 is supported by an outer axis support structure 14 (see FIGS. 1 and 2). The outer axis structure 14 is sometimes referred to as a "yoke".

The gimbal 10 includes an outer azimuth drive module 16 that moves the entire ball 12 (as well as the outer axis support structure 14) with respect to the vehicle about the outer azimuth axis 11b. The outer azimuth axis 11b is typically in substantial alignment with respect to the inner azimuth axis 11d. Course adjustments in azimuth are accomplished by moving the ball 12 along the outer azimuth axis 11b. Course adjustments is elevation are accomplished by moving the ball along the outer elevation axis 11a.

As desired, a cooling and heating assembly 18 is used to maintain a proper temperature in the ball 12. An electronics package 20 that includes all necessary circuitry is included in the ball 12, as well.

A zoom type of a television camera 22 is often included to aid in sighting and aligning the gimbal 10 with the object of interest.

After spotting the object of interest with the zoom camera 22, a main camera 24 (or sensor) is used to further examine the object of interest. The main camera 24 may have greater light gathering ability or a longer focal length than the zoom camera 22. It may also rely upon other sensing technologies, as are discussed in greater detail hereinafter. The zoom camera 22 may be used for finding the objects of interest with the task of actual data collection being deferred to the main camera 24.

The main camera 24, as mentioned, may include other types of sensors including infrared, ultraviolet, radio frequency, or any other type of a sensor, as may be desired.

The zoom camera 22 along with the main camera 24 also shows how the offset cardan gimbal 10 may be used to support a plurality of sensors. Obviously, any number of sensors may be included in the ball 12 as are desired and practical. The zoom camera 22 and the main camera 24, as shown, form the payload of the gimbal 10. Support for the payload (i.e., the zoom camera 22, the main camera 24, or other sensors) is described in greater detail hereinafter.

A gyroscope package 26 is typically included in the ball 12 that includes a plurality of gyroscopes that are used to provide a reference signal. The reference signal is supplied to the electronics package 20 and is used to indicate a change in attitude (i.e., movement) by the vehicle.

As mentioned hereinabove, any type of a vehicle to which the gimbal 10 is attached may be used. It may be a land vehicle, and aircraft, or a sea or watercraft.

If the vehicle is an aircraft, for example an airplane (not shown) to which the gimbal 10 is attached, the vehicle, in particular the deck of the vehicle, (i.e., the aircraft) becomes a reference.

If the main camera 24 is pointed at an object of interest and the airplane moves about any axis (either in pitch [i.e., elevation], roll, or yaw [i.e., azimuth]) the gimbal 10 detects this motion by the aircraft (the gyroscope package 26 detects it) and the electronics package 20 instantaneously supplies a corrective electronic signal to any of a plurality of motors (not shown) in order to move the ball 12 of the gimbal 10 or the payload within the ball 12 or both so as to ensure that the main camera 24 remains pointed at the object of interest.

The motors that move the payload with respect to (i.e., within) the ball 12 are used for finer types of corrections. These motors control movement about the inner elevation, azimuth, and roll axes 11c, 11d, and 11e respectively, and are mounted inside the ball 12, where desired. They move the payload that is inside of the ball 12 around these axes a small amount to correct for subtle changes in movement by the vehicle. The motors used are of a type that is appropriate for the application at hand. Those skilled in the art are able to select appropriate types and sizes of (electrical) motors to effect movement about the three inner axes 11c–e.

A window 28 provides viewing access (i.e., an interface) for the main camera 24 (or sensors) with the outside world. The window 28 can be considered an objective lens. The larger the window 28, the greater the light gathering ability for the main camera 24 (or sensors).

Although refractive types of optics may well be used with the offset cardan gimbal 10, a reflective type of an optical system is shown as one example (of a payload) and it includes a primary mirror 30 and a secondary mirror 32 as well as an optical mechanism 34 that is used to direct, adjust the focus, and also to control the field of view of the image that is supplied to the main camera 24.

An outer elevation drive module 36 includes bearings that support one end of the ball 12 and an outer elevation drive motor 102 (See FIGS. 3, 5) for moving the ball 12 about the outer elevation axis 11a. Courser adjustments in elevation, as were discussed hereinabove, are made by moving the ball 12 in a limited arc about the outer elevation axis 11a. The ball 12 moves in elevation with respect (i.e., relative) to the outer axis support structure 14.

An outer elevation bearing module 38 includes bearings that support the opposite end of the ball 12. The outer elevation axis 11a passes through the center of the bearings of both the outer elevation drive module 36 (on one end of the ball 12) and the outer elevation bearing module 38 (on the opposite end of the ball 12).

Figure 2:
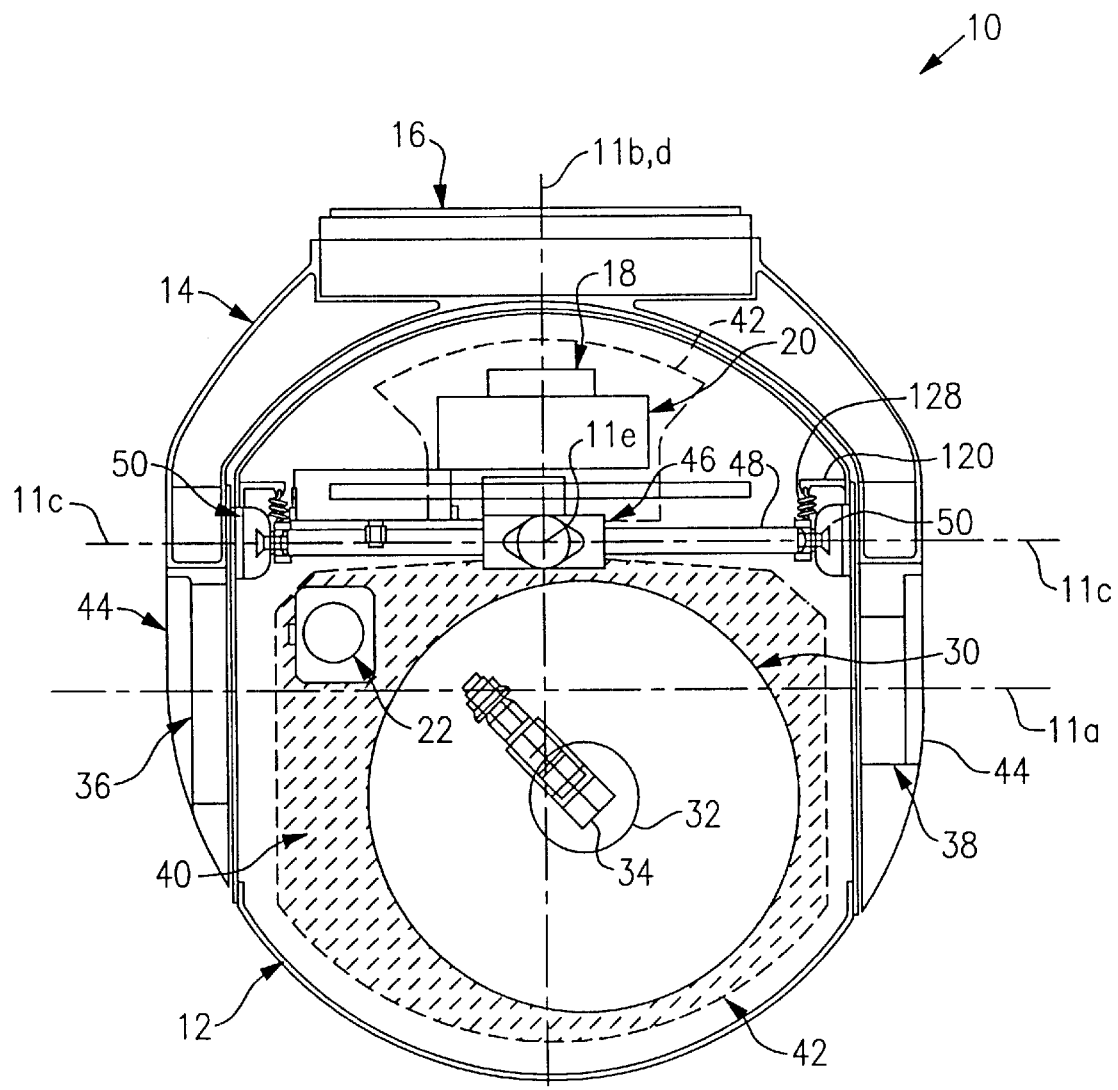
FIG. 2 is a cross-sectional front view of the offset cardan gimbal of FIG. 1.

Referring to FIG. 2, a crosshatch pattern 40 shows a cross-section of the available volume for additional or larger payloads, as desired.

A vibration clearance 42 is provided around the payload to prevent any part of the payload from contacting the inside of the ball 12.

A pair of streamlining covers 44 are attached to the outer axis structure 14 and smooth both appearance and air flow around the gimbal 10.

A three axis cardan assembly 46 is supported on each end of a cardan shaft 48 by a pair of vibration isolators 50. The three axes of motion that are provided by the cardan assembly 46 include movement around the inner elevation axis 11c, the inner azimuth axis 11d, and the inner roll axis 11e. The payload is moved within the ball 12 along these axes 11c–e.

The inner elevation axis 11c passes through the center of the cardan shaft 48. The inner azimuth axis 11d, as mentioned hereinabove, is usually coincident with the outer azimuth axis 11b. The inner roll axis 11e extends in and out of the drawing of FIG. 2.

The inner elevation axis 11c (i.e., the cardan shaft 48) is in parallel alignment with respect to the outer elevation axis 11a and is offset therefore a predetermined distance. The offset is accomplished by raising the cardan assembly 46 above the outer elevation axis 11a.

This offset provides the necessary clearance to allow for the window 28 to be larger than it could be were the inner elevation axis 11c coincident with the outer elevation axis 11a. By offsetting the cardan assembly 46, a larger payload, including a larger type of the primary mirror 30, is possible.

Figure 3:
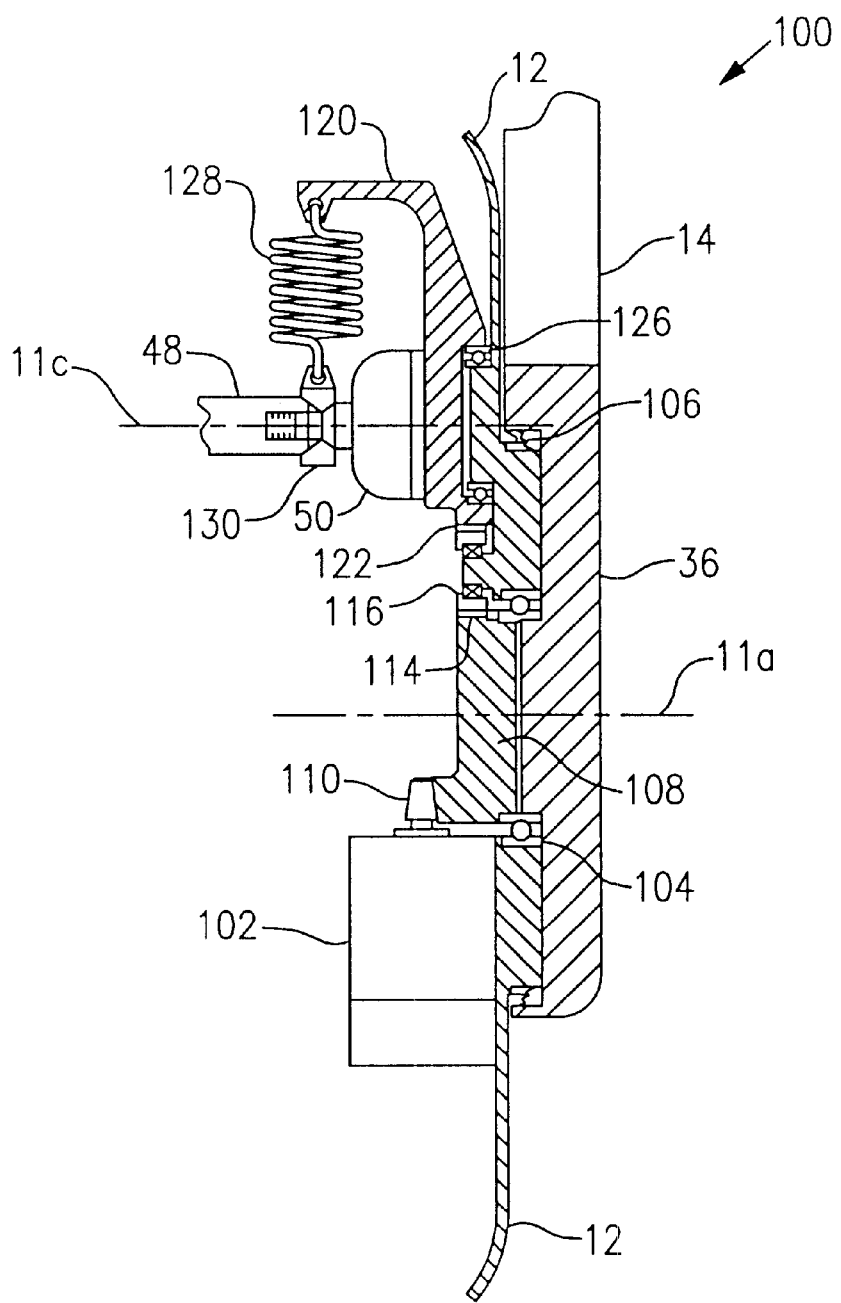
FIG. 3 is a cross-sectional detailed view of the outer elevation drive module of FIG. 2 showing the cardan support structure that is disposed on one side of the gimbal.
Figure 4:
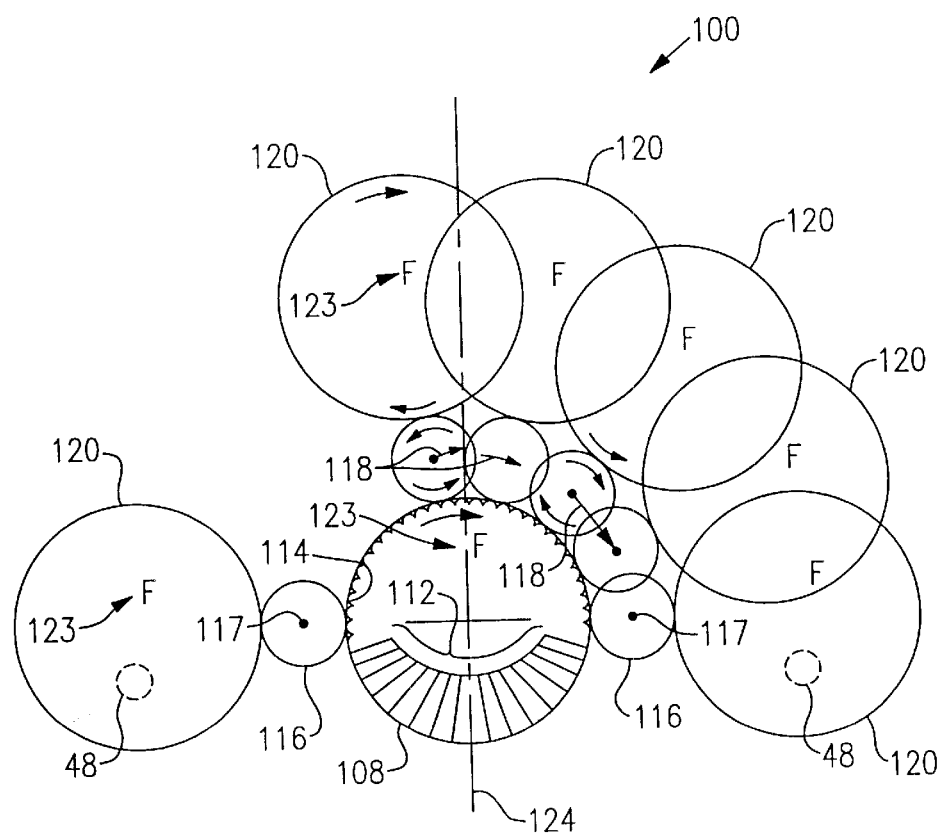
FIG. 4 is a pictorial illustration of the direction of support of a counter balancing force that is provided by the cardan support as the gimbal ball moves in elevation.
Figure 5:
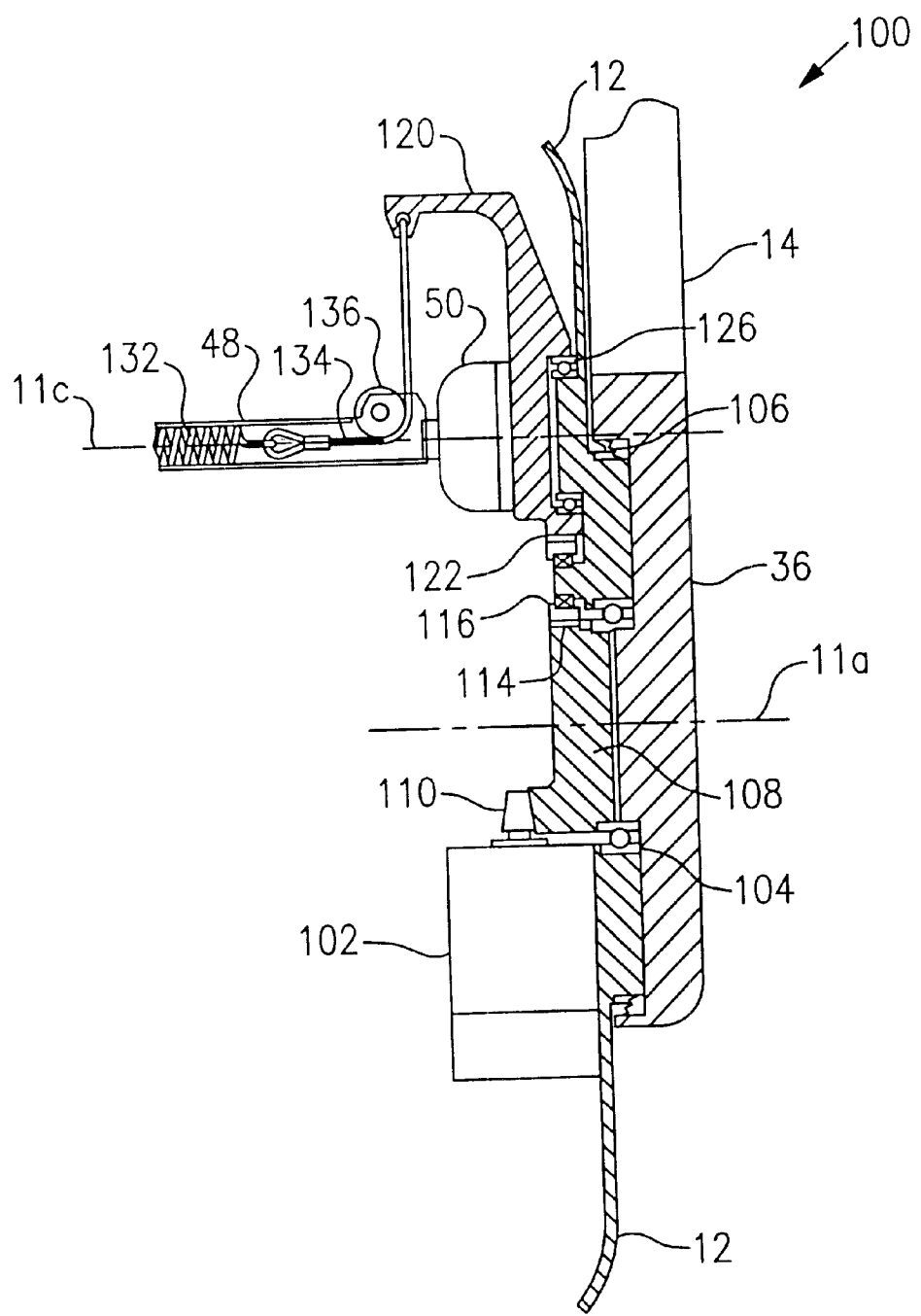
FIG. 5 is an alternative positioning for a modified spring disposed in a cardan shaft.

Referring now to FIGS. 3–5, a cardan support, identified in general by the reference numeral 100 is shown. Also shown are the outer elevation drive motor 102 and other component parts of the outer elevation drive module 36.

The outer elevation drive motor 102 is physically attached to the ball 12. The ball 12 is attached to the outer axis structure 14 by an elevation bearing 104 and by an environment seal 106. The ball 12 pivots about the outer elevation axis 11a (which is the ball centerline).

A bevel sector and spur gear 108 (or center gear) is fixedly attached to the outer axis structure 14. The outer elevation drive motor 102 includes a bevel pinion gear 110 that meshes with a bevel section 112 (FIG. 4) of the bevel sector and spur gear 108. The remaining portion of the bevel sector and spur gear 108 includes spur gear teeth 114 disposed on the outside circumference.

There are other ways to design the bevel sector and spur gear 108, for example, so that a modified bevel section is disposed on an inside of the gear (not shown) and the spur gear section is disposed around the outside circumference, as is well known to those having skill in the art of gear design.

What is important to remember is that the bevel sector and spur gear 108 is fixedly attached to the outer axis structure 14 and that the outer elevation drive motor 102 is attached to the ball 12. Therefore, when the outer elevation drive motor 102 is energized, the ball 12 (along with the outer elevation drive motor 102) moves in an arc about the outer elevation axis 11a.

Referring momentarily to FIG. 4, as the outer elevation drive motor 102 is energized, the bevel pinion gear 110 moves along the arc of the bevel section 112. This defines the range of motion that is possible for the ball 12 around the outer elevation axis 11a.

The spur gear teeth 114 mesh with the teeth of a spur idler gear 116. The spur idler gear 116 is pivotally attached about a center axis 117 to the ball 12. Therefore, as the ball 12 moves in an arc the spur idler gear 116 moves relative to the bevel sector and spur gear 108 around the outer elevation axis 11a (when urged by the elevation drive motor 102). The spur idler gear 116 rotates around the center axis 117 as it moves in an arc (see first arrow 118) around the bevel sector and spur gear 108. (see FIG. 4)

A cardan support crane 120 includes a spur sector gear portion 122 attached thereto that also meshes with the spur idler gear 116. The spur sector gear portion 122 of the cardan support crane 120 is at a one to one gear ratio (i.e., same size teeth and radius) with respect to the spur gear teeth 114 of the bevel sector and spur gear 108.

Accordingly, the cardan support crane 120 is shown disposed in a number of positions in FIG. 4 as the ball 12 rotates about the outer elevation axis 11a. As can be seen a symbol 123 "F" shown on the cardan support crane 120 at each possible location is always upright and in parallel alignment with a normal line 124 and with the symbol 123 "F" that is also shown on the bevel sector and spur gear 108.

The normal line 124 is normal with respect to the surface (i.e., the deck) of the vehicle upon which the gimbal 10 is mounted.

The cardan shaft 48 (shown in two extreme locations in dashed lines) in FIG. 4 is always disposed directly under the cardan support crane 120 centerline. Accordingly, and as is described in greater detail hereinafter, the cardan support crane 120 always supplies a counter balancing force to the weight of the payload that is in parallel longitudinal alignment with respect to the normal line 124, regardless of the elevational attitude of the ball 12.

In a gear system, the cardan support crane 120 functions as a driven gear in a one to one gear ratio with the spur idler gear 116 functioning as an "idler" gear intermediate the spur gear teeth 114 and the spur sector gear portion 122.

A cardan isolator assembly bearing 126 supports the cardan support crane 120 within the ball 12 and allows it to rotate about the inner elevation axis 11c.

A cardan support spring 128 is selected to offset approximately one-half of the weight of the payload on a first end of the cardan shaft 48. It supplies a counter balancing force to the first end of the cardan shaft 48 that is in parallel longitudinal alignment with respect to the normal line 124 regardless of the elevational attitude of the ball 12.

The entire structure is again repeated in a mirror image on the opposite side of the cardan shaft 48. A second outer elevation drive motor (not shown) can be used when additional torque is desired, or it can be eliminated from the opposite side and the elevation drive motor 102 can be used to drive the mirror image side.

On the mirror image side, a second spur idler gear will move about a second bevel sector and spur gear and be forced to rotate about a center axis thereof. In turn, the second spur idler gear will drive a second cardan support crane in a manner identical to that described hereinabove. A second spring will support the opposite end of the cardan shaft 48 and it will always supply a counter balancing force for the payload (typically one-half the payload weight) in an upward direction that is also in parallel longitudinal alignment with respect to the normal line 124, but is opposite to the direction of the load that is imposed by the payload.

Obviously, if the second elevation drive motor is omitted from the opposite side, the need for the bevel section 112 is optional for the second bevel sector and spur idler gear.

The vibration isolators 50 that support each end of the cardan shaft 48 are each attached to one (of two) of the cardan support cranes 120. The vibration isolators 50 are therefore required to support less of the weight of the payload, regardless of the position of the cardan shaft 48 as it moves relative to the bevel sector and spur gear 108 as the ball 12 rotates along the outer elevation axis 11a. This is because the cardan support 100 provides a method for supplying a counter balance force (in parallel alignment with the normal line 124 and extending upward toward the vehicle) regardless of the elevationnal position of the ball 12 or of the cardan shaft 48 within the ball 12.

This allows for the design of much softer materials and types of construction for the vibration isolators 50. Accordingly, the softer types of the vibration isolators 50 better dampen vibrations and they therefore also permit the sensors of the payload to better track the object of interest.

The spring 128 is attached at an upper end to the cardan support crane 120 and at a remaining end to a clamp 130 that is attached to the first end of the cardan shaft 48.

It is important to remember that there is a second spring (not shown) that supports the opposite end of the cardan shaft 48 and it is similar or identical to the spring 128.

Referring now in particular to FIG. 5, an alternative positioning for a modified spring 132 that is disposed within the cardan shaft 48 is shown. A tension cable 134 is attached at one end to a first end of the modified spring 132 and to the cardan support crane 120 at the remaining end of the cable 134. A pulley 136 is pivotally attached to the first end of the cardan shaft 48 and it is used to change direction of the cable 134.

The mirror image, in this instance, has a second cable connected at one end to a second end of the modified spring 132 and to a second cardan support crane at a second cable end. A second pulley is pivotally attached to the opposite end of the cardan shaft 48 about which the second cable passes.

The alternative positioning provides certain advantages. As the cardan shaft 48 is hollow (across the diameter of the ball 12) the modified spring 132 is able to be disposed therein. The need for a second spring is therefore eliminated. The characteristics of the modified spring 132 are, of course, changed so that it alone is adapted to support the entire weight of the payload. The alternative positioning also allows for closer positioning of the cardan support crane 120 with respect to the cardan shaft 48.

Because the cardan support 100 maintains the same proximity intermediate the cardan crane support 120 and the cardan shaft 48 regardless of the position of the ball 12, it also allows for a comparatively short range of motion for the spring 132. Therefore, the need for long fluctuations and expensive types of constant force springs is eliminated. Furthermore, a compact structure for supporting the cardan shaft 48 is provided.

While a gear arrangement is shown to maintain alignment of the cardan support crane 120 over the cardan shaft 48, other methods are anticipated as well including, for example, the use of belt drive mechanisms that rely upon the fundamental teachings, as disclosed herein, are also anticipated.

Reference now to FIGS. 6, 7, 8 and 9 alternative arrangements.

Figure 6:
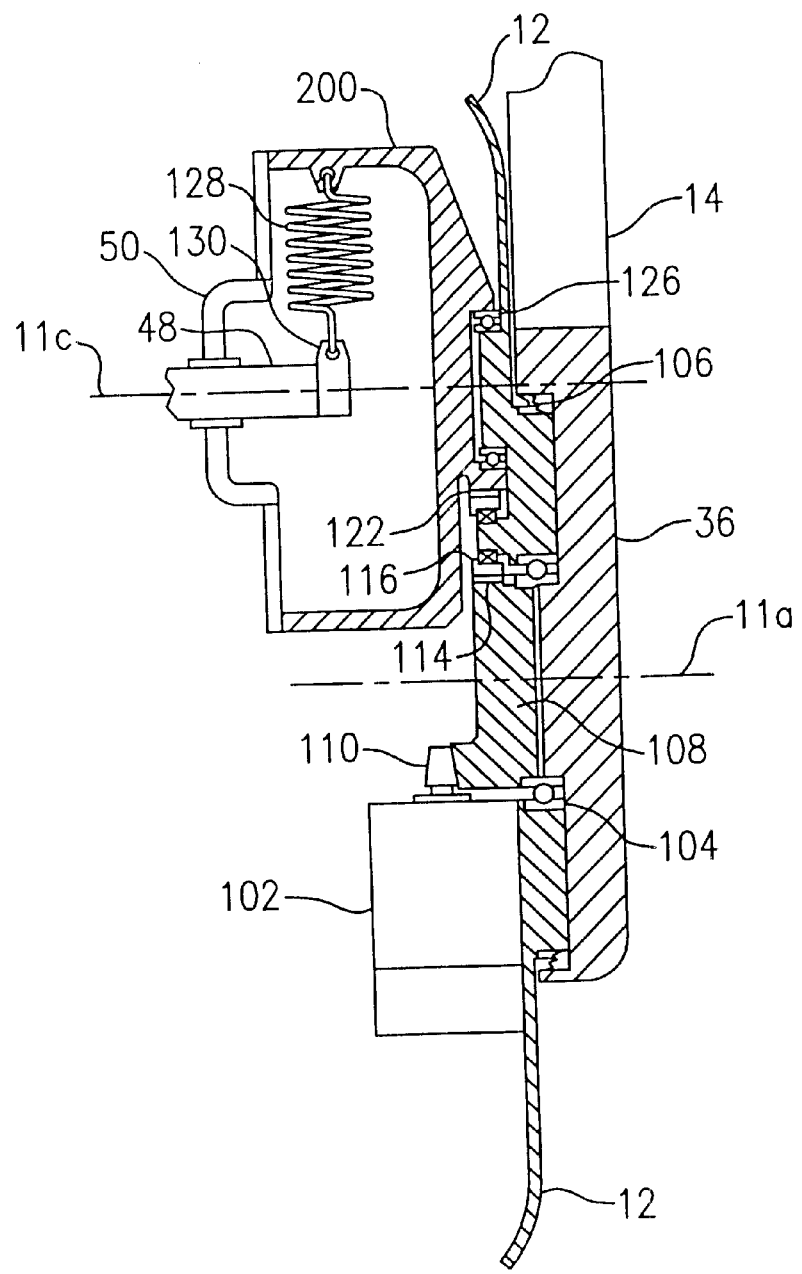
FIG. 6 shows an alternative configuration where the crane arm is incorporated into a rotating housing.

FIG. 6 shows an alternative configuration where a modified type of a crane arm is incorporated into a rotating housing 200 which supports the spring 128. The housing 200 is also used to support the isolator 50.

Figure 7:
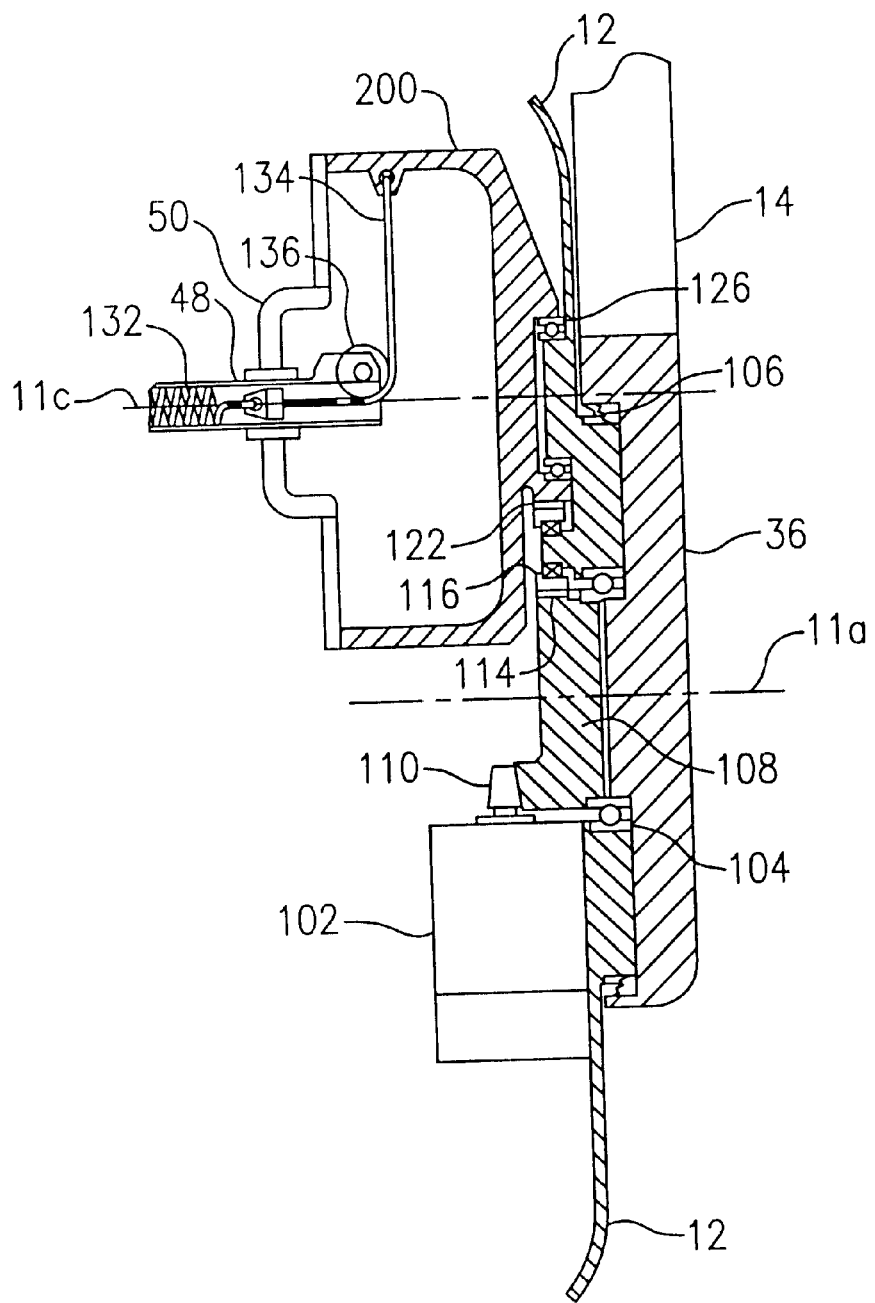
FIG. 7 shows an alternative configuration where the crane arm is incorporated into a rotating housing and a modified spring disposed in a cardan shaft.

FIG. 7 shows an alternative configuration where the modified type of a crane arm is incorporated into the rotating housing 200 which now supports the cable 134 (instead of the spring 128). The housing 200 also supports the isolator 50. In this configuration (as shown in FIG. 7), the cable 134 passes through the center of the isolator 50.

Figure 8:
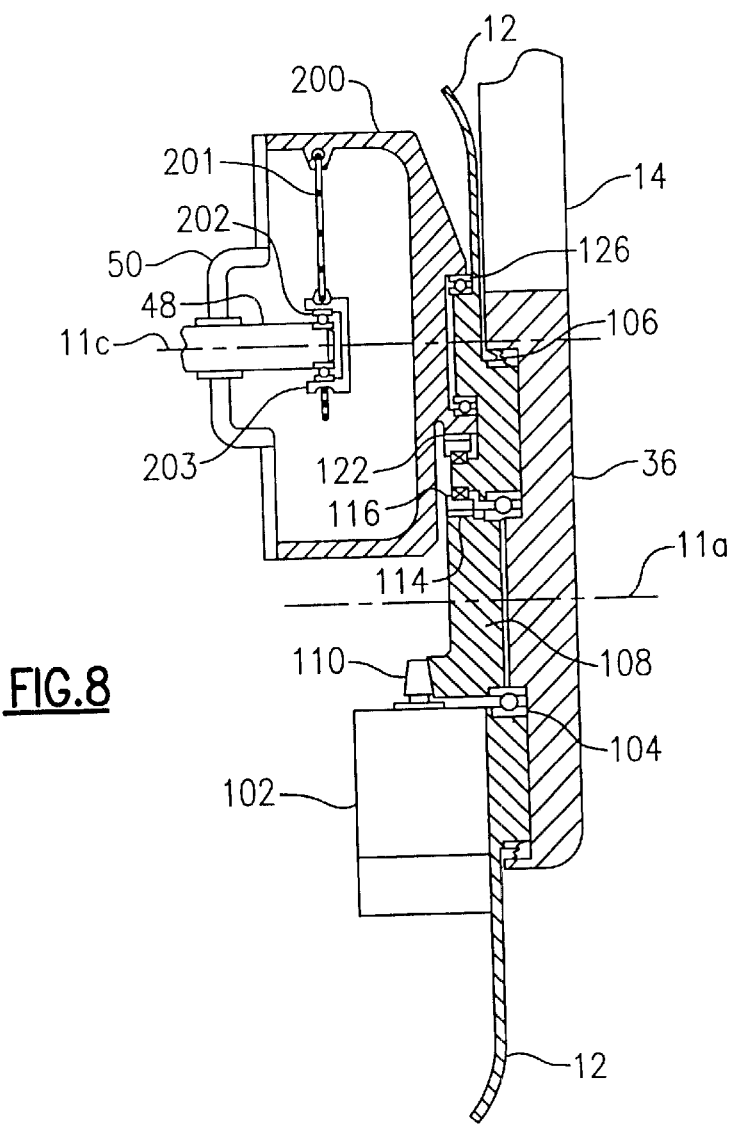
FIG. 8. shows an alternative configuration where the crane arm is incorporated into a rotating housing which supports a unique spiral spring.

FIG. 8. shows an alternative configuration where the modified type of a crane arm is incorporated into the rotating housing 200 which supports a modified spiral spring 201. The spiral spring 201, which supports the gravitational load of the inner gimbal, includes a unique spiral configuration. The spiral spring 201 can be formed of either round or rectangular cross section wire or strip material. The end of the spiral spring 201, which supports the cardan shaft 48, is mounted on a roller guide 203 which is mounted on a bearing 202. This alternative configuration provides for a softer spring action. Furthermore, it does not apply a rotational torque to the cardan shaft 48 as the spiral spring 201 extends or retracts.

Figure 9:
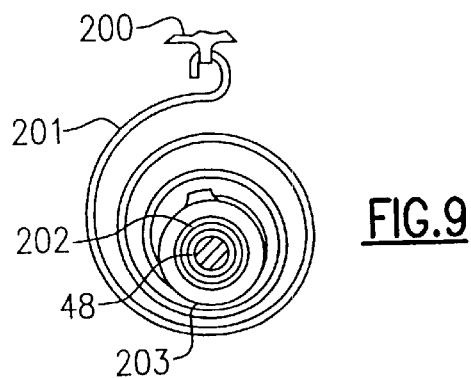
FIG. 9. shows an alternative configuration where the crane arm is incorporated into a rotating housing which supports a unique spiral spring. This is shown in a view looking down the axis of the cardan shaft.

FIG. 9. is a view looking down the axis of the cardan shaft 48. The spiral spring 201 is shown hanging from the rotating housing 200 (i.e., the modified type of a crane arm) and mounted to the roller guide 203 which is mounted on the bearing 202 which supports the cardan shaft 48.

The invention has been shown, described, and illustrated with reference to the presently preferred embodiments thereof. It will be understood by those skilled in this art that other and further changes and modifications may be made without departing from the spirit and scope of the invention which is define by the claims appended hereto.

What is claimed is:

1. A cardan support for a gimbal, comprising:
   (a) means for supplying a counter force for a payload disposed in a gimbal ball with respect to a cardan shaft, said counter force adapted to offset at least a portion of the load applied to said cardan shaft by said payload; and
   (b) means for maintaining said counter force in a normal attitude with respect to said cardan shaft when said gimbal ball is rotated about an external elevation axis.

2. The cardan support of claim 1 wherein said means for supplying a counter force includes a cardan support crane and at least one spring, said at least one spring attached at one end thereof to said cardan support crane and to said cardan shaft at a remaining end.

3. The cardan support of claim 2 wherein said means for supplying a counter force includes a second cardan support crane and a second spring, said second spring attached at one end thereof to said cardan support crane and to an opposite end of said cardan shaft at a remaining end of said second spring.

4. The cardan support of claim 2 wherein said at least one spring is an extension spring.

5. The cardan support of claim 4 wherein said extension spring is disposed intermediate said cardan shaft and said cardan support crane.

6. The cardan support of claim 4 wherein said extension spring is disposed within said cardan shaft.

7. The cardan support of claim 6 including a first cable intermediate one end of said extension spring and said cardan support crane.

8. The cardan support of claim 7 including a pulley attached proximate an end of said cardan shaft and adapted to rotate about an axis, said pulley adapted for changing the direction of said first cable.

9. The cardan support of claim 6 including a second cable intermediate one end of a said extension spring and a second cardan support crane that is disposed on an opposite side of said cardan shaft.

10. The cardan support of claim 2 wherein said means for maintaining said counter force in a normal attitude with respect to said cardan shaft when said gimbal ball is rotated about said outer elevation axis includes means for maintaining said cardan support crane in a normal attitude with respect to the deck of a vehicle on which said gimbal is mounted.

11. The cardan support of claim 10 wherein said means for maintaining said cardan support crane in a normal attitude includes gear drive means.

12. The cardan support of claim 11 wherein said gear drive means includes a bevel sector and spur gear that is fixedly attached to an outer support structure, said outer support structure providing support for said ball to rotate in an arc about said outer elevation axis, said bevel sector and spur gear including a quantity of spur gear teeth disposed along an outer circumference thereof, said quantity of spur gear teeth adapted to mesh with a spur idler gear said spur idler gear adapted to pivot about a center axis and wherein said center axis is attached to said ball, whereby as said ball is urged about said outer elevation axis said spur idler gear rotates about said center axis and traverses in an arc along a portion of said quantity of spur gear teeth of said bevel sector and spur gear, and wherein said cardan support crane includes a spur sector gear portion attached thereto that meshes with said spur idler gear and wherein said spur sector gear portion includes a one to one gear ratio with respect to said bevel sector and spur gear.

13. A method for maintaining support for a cardan in a gimbal ball, which comprises:
   (a) Providing a cardan shaft in said gimbal ball, said cardan shaft adapted to support a payload;
   (b) Providing an outer axis structure adapted to support said gimbal ball and including means for providing for the motion of said ball about an external elevation axis; and
   (c) Providing a counter force to offset at least a portion of the force exerted upon said cardan shaft by said payload, said counter force disposed in a substantially normal attitude with respect to said payload when said ball is rotated about said external elevation axis.

\* \* \* \* \*